July 10, 1951  H. H. HINSON  2,560,510
METHOD OF DETERMINING PATH, RATE OF FLOW, ETC.,
IN SUBSURFACE STRATA
Filed Oct. 23, 1948  2 Sheets-Sheet 1

INVENTOR.
HOWARD H. HINSON
BY
Oberlin & Limbach
ATTORNEYS.

INVENTOR.
HOWARD H. HINSON

Patented July 10, 1951

2,560,510

UNITED STATES PATENT OFFICE 2,560,510

METHOD OF DETERMINING PATH, RATE OF FLOW, ETC., IN SUBSURFACE STRATA

Howard H. Hinson, Ponca City, Okla., assignor to Continental Oil Company, Ponca City, Okla., a corporation of Delaware Application October 23, 1948, Serial No. 56,114

3 Claims. (Cl. 250—83.6)

This invention relates as indicated to a method of ascertaining the fluid conductance of earth layers, and more specifically to a method for determining path, rate of flow, flow pattern, relative permeability or conductance and vertical and areal location of flow of liquids in subsurface strata by the use of penetrating boreholes and the injection of radioactive incompressible fluids into one or more of said boreholes.

Direct knowledge of the relative permeability of the various layers of the generally nonhomogeneous productive horizons in the production of oil and gas from substrata is necessary to offset the deleterious effects of coning, gas bypassing, premature water fingering or encroachment, and lack of selective control over fluid extraction from layers of widely different effective permeabilities. This is especially true where gas is injected or cycled or where other fluids are forced into the reservoir rocks to maintain pressure for maximum recovery.

One method of obtaining this information indirectly is the coring operation. However, this laborious analysis depends upon experience and yields only approximations because of the alteration of fluid saturation and consequent alterations of relative permeabilities. More recent methods involve surveys of radioactivity comprising impressing sub-surface stratum with a radioactive gas and then measuring the radioactive characteristics of such stratum. This method may also be used for the purpose of determining the relative permeability or fluid conductance of the different subsurface stratum intersected by a borehole. The face of a layer as intersected by a borehole will be impressed with a radioactive fluid and then other boreholes intersecting the same stratum logged with a radioactivity detector to determine the lateral or areal distribution of a porous stratum. An example of this method is the French Patent 2,429,577.

It has been observed that a radioactive gas when introduced to certain formations, in accordance with the process of the French patent, has a somewhat different type of distribution in the sub-surface strata than do other materials, especially incompressible fluids so that the areal distribution of the introduced gas is not always a true pattern of the flow channels in the area and in certain formations, the gas flow, even if traced, does not afford much information as to the relative sizes of the voids in different parts of the formation being investigated. The flow of gas through the sub-surface strata is usually not along well-defined channels. This is due to the fact that gas tends to segregate by the effect of gravity, therefore, a true path of liquid flow is not obtained. The particle size of incompressible radioactive fluids can be rigidly controlled so that the particle size closely approximates the particle size of the subsurface liquids. In this way, the incompressible fluids will follow the flow of liquids to give a true flow pattern.

It is among the objects of my invention to provide a method having advantages over the described prior art and none of the disadvantages inherent in the same.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Broadly stated, this invention comprises a method for determining the fluid conductance of a sub-surface stratum which comprises impressing such stratum in a local area with a radioactive incompressible fluid and then measuring the radioactive characteristics of such stratum at least at one point remote from such local area.

By the term "incompressible fluid" as used herein, I intend to include not only radioactive homogeneous liquids but also radioactive solids of controlled particle size, these being usually entrained in a liquid which may or may not be radioactive.

From the foregoing broad statement, it will be observed that my new method may be used to advantage in determining the lateral or areal distribution of a porous stratum, and to determine the relative permeability of the different sub-surface stratum intersected by a borehole in a manner generally more satisfactory than any other heretofore previously employed and giving more detailed and accurate information as to the condition of the sub-surface strata.

The conditions of flow rate, time, particle size, oil and water solubility of the solids or liquids employed may determine the refinements as to degree of fluid conductance, etc.

In the further explanation of my improved method, it becomes convenient to illustrate apparatus by which such method may be carried out, one form of such apparatus being illustrated in the drawings, in which.

Figure 1:
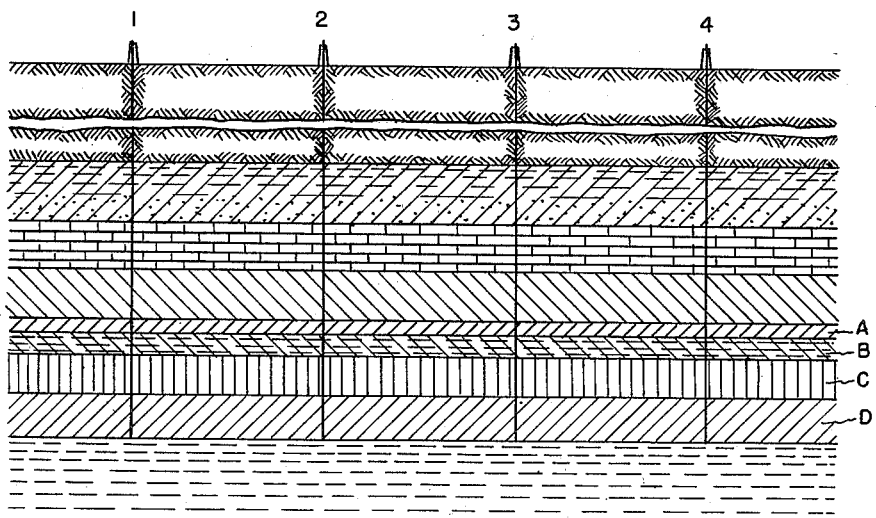
Fig. 1 is a vertical section showing wells 1, 2, 3 and 4 each intersecting earth strata A, B, C and D with one of such wells, as for example No. 3, being the well through which the radioactive material is introduced through the strata to be studied and the other wells being the ones in which logs are made showing the increase in concentration in radioactive material in strata under study.
Figure 3:
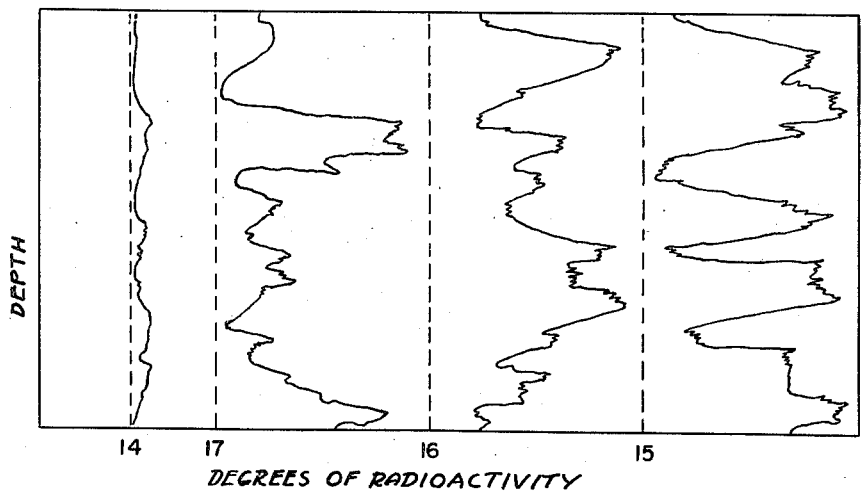

Fig. 3 is an illustrative log of the detector record showing the significantly different results obtained in a selected well when using various radioactive materials. For ease of understanding and in order to show the several traces somewhat more distinctly, they are shown laterally displaced with respect to each other, however, deviations at any particular point on each trace may be determined by having reference to the index line.

Figure 2:
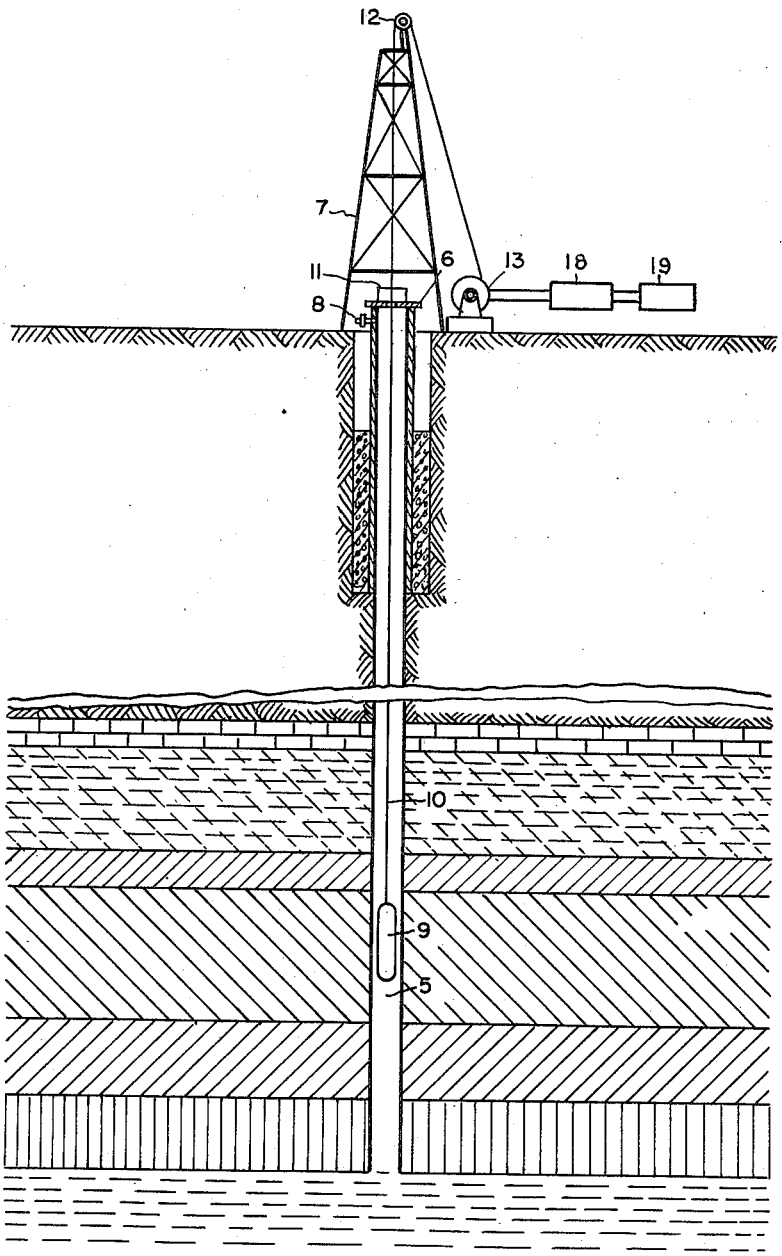
Fig. 2 is a diagrammatic representation of apparatus which may be used in any of the wells for the purpose of determining the concentration of radioactive material in the various strata.

Referring now more specifically to the drawings, it will be noted that the various wells used in carrying out my improved method may be cased or uncased provided the casing is perforated opposite the face of the strata to be studied. Let it be assumed for the time being that the well shown in Fig. 2 is the input well 3. Well bore 5 is capped by casing 6 with derrick 7 positioned just over casing 6. Casing 6 is provided with a connection 8 through which the radioactive materials may be introduced into the well-bore by conventional means. At each of the wells a detecting instrument 9 is suspended in the well-bore by means of line 10 which passes through guide 11, then over the measuring sheave 12 and is finally wound on drum 13. Amplifier 18 and recorder 19 serve to permanently record the readings made by detector 9, such a record constituting the log.

The operation and construction of the measuring sheave 12 and related hoisting apparatus is well known to those skilled in the art and it is felt that further detailed description is not necessary. The detecting instrument 9 is of conventional design, operating on well-known principles, one example being the Geiger-Müller counter.

In carrying out my improved method, I prefer to use a record making device which will provide a trace on an elongated strip, the increments of length on the strip being an indication of the vertical distances in the well-bore and the lateral deviations of the trace being an indication of the radioactivity of the well-bore at any particular point.

Fig. 3 is a representation of a record made at a study well such as any of wells 1, 2 and 4 by logging such injection of different radioactive materials with a sufficient lapse of time between different studies to permit decay of the radioactivity of the previous injections. Trace 14 represents a natural log of the well-bore. This is necessary in making any final determination because of the fact that even when no radioactive material is introduced to the strata being explored, the loggings of such strata by a radioactivity detector will show natural earth influences on the sensitive instrument. This is clearly indicated by the rough contour of trace 14.

After this original natural log has been made and recorded of study wells 1, 2 or 4, it is now possible to make subsequent loggings of such study wells 1, 2 or 4 by using radioactive materials injected in input well 3 to determine the distribution in a selected stratum intersected by wells 1, 2 and 4. Trace 15 represents a logging of any of the representative study wells 1, 2 and 4 after the injection of a radioactive gas in the input well 3 as taught by French 2,429,577.

It has been found that a radioactive gas when introduced in accordance with the process of the French patent has a significantly different type of distribution in the subsurface stratum than either the radioactive liquids or finely divided solids showing zones which readily take one type of radioactive material and not the others under the same set of conditions. Further, significantly different results are secured when using an oil soluble radioactive material as compared with a water-soluble and oil insoluble radioactive material. The same is true of the results secured from the use of radioactive finely divided materials which were previously wet with water or wet with oil before injection and in this connection it is intended to include the use of radioactive materials suspended in oil and likewise the use of radioactive materials suspended in water.

With regard to the use of finely divided radioactive solid material, its penetration into and through the subsurface stratum is not only a function of whether the solid material has been initially wet with oil or water, but also a function of the particle size giving some indication as to the physical characteristics of the stratum through which it is caused to flow.

Traces 16 and 17 represent loggings made after the injections of liquids and solids respectively.

It has been a previous practice to inject a radioactive solid into a representative input well and then log such input well with a radioactivity detector to determine the permeability of the various earth strata of that particular well-bore. It has also been taught to use a radioactive gas introduced into an input well of a producing zone having more than one producing well and then tracing the path of such radioactive gas from the input well to the various producing wells by means of radioactivity detectors placed into the producing wells. The presence of the radio active gas in any of the producing wells indicates the possibility of commingling of streams in the producing zone. The time interval of injection of the radioactive gas into the input well and its emergence of any of the producing wells gives indication of the characteristics of the connecting stratum. My present invention includes the use of radioactive incompressible fluids which include homogeneous radioactive liquids and finely divided solid material of a particle size small enough to cause flow of such solid material. The loggings obtained when injecting incompressible radioactive solid material into the input well and then out of a representative producing well are all dependent upon the conditions of the radioactive materials injected. That is to say, the trace obtained by using oil soluble radioactive liquids is vastly different from that obtained by using oil insoluble or water soluble radioactive liquids. This of course is due to a particular stratum either holding back an oil insoluble liquid or absorbing an oil soluble radioactive liquid. This is also true of a finely divided radioactive solid. The oil wet radioactive solid will penetrate deeper into an oil absorbing stratum than it would in a stratum filled with water. An indication of the characteristics of the stratum to be studied is given by the particle size of the finely divided solids whether oil wet or water wet. The penetration by fine material to a producing well and the failure of penetration of the radioactive solids gives valuable information of the producing zone not possible through other methods.

My invention then not only comprises the use of radioactive incompressible fluids used singly in the tracing of the representative producing wells giving significantly different traces from that obtained by the prior art, but from a study of all of the traces as obtained in my improved method using all of the various radioactive materials mentioned, it is possible to obtain knowledge of the earth strata not indicated by any single trace irrespective of the radioactive material used in making that trace.

Curve 15 shows deep penetration at its upper region and even greater penetration at the lower end, indicating a high permeability zone at its lower portion. Curve 16 indicates greater permeability to liquid at the upper portion while indicating lower permeability at the bottom portion than that exhibited by curve 15. Curve 17, that of a solid log, indicates a very low solid permeability at the extreme top portion, followed by a marked increase in relative permeability beyond that of either gas or liquid, then settling in its lower portion to a low solid permeability.

The radioactive materials may be introduced to either completed wells or the method of the invention may be used during the drilling stages of a well and prior to the final completion in the permanent producing horizon. Similar tests may be made prior to completion of the well to determine whether activated materials injected in surrounding wells are being produced in sections of the subject well.

Radioactive liquids or solids such as, but not limited to, fission products, separated radioisotopes, irradiated substances, cyclotron-produced radioactive materials, or betatron produced radioactive materials may be used to trace conditions in sub-surface strata. The radioactive liquids or solids may either be naturally occurring liquids or solids from sub-surface strata, which liquids or solids have been made radioactive, or other made radioactive liquids or solids may be introduced into fluids which will serve as carriers for them.

Radioactive liquids or solids may be introduced into fluids being injected into a borehole having connection with a sub-surface stratum. The radioactive liquids or solids will be carried by the fluids down the borehole and into the subsurface stratum. The fluids being injected will flow through the sub-surface stratum to other wells being used to remove the fluid from the sub-surface stratum. The appearance of the radioactive liquids or solids at the removal wells may be determined by instruments usually used to detect radioactivity as described earlier in the specification. Instruments can also be lowered into the borehole to determine the relative productivity, permeability and porosity of each portion of the sub-surface stratum by measuring the relative intensity of the radioactivity of fluids in the sub-surface stratum adjacent to the borehole. The path of flow, rate of flow, and relative permeability of the sub-surface stratum may be determined areally by determining the appearance of radioactive materials in the removal wells in the pool common to the flow of fluids carrying radioactive liquids or solids.

The relative conductance or permeability of the sub-surface stratum around a well bore may be determined by impressing the stratum with fluid carrying radioactive liquids or solids and measuring the vertical variation in radioactivity in the well bore where it intersects the sub-surface stratum.

The location of fluid flow, both vertically and areally in sub-surface strata may be determined by injecting fluids carrying radioactive liquids or solids into one or more boreholes that connect with the sub-surface strata and are used as input boreholes, then traversing the boreholes of both input wells and removal wells in the common pool with a detector which records relative concentrations or intensity of radioactive material.

Due to the fact that the porosity or conductance characteristics of a stratum many times change during the life of a well, it is preferred to use a radioactive substance which has a relatively rapid rate of deterioration so that a particular injection of the radioactive material will not be contaminated by previous injections in the same or adjacent wells.

It is possible from a study of one well by the disclosed method, to do remedial work, such as sealing off gas zones to allow pressure recovery of deep oil deposits. Through the use of short-life radioactive material, subsequent tracing may be done soon after when reservoir conditions have changed, without the masking of true conditions by stale and relatively permanent sources of radioactivity.

The preferred concentration range of the radioactive material in the carrier substance is of the order of $1.7 \times 10^{-6}$ curies per barrel to $4.2 \times 10^{-5}$. Concentrations above and below the values given will be necessary depending on the radioactive substance used, the characteristics of the conditions being investigated, and the amount of diffusion or dilution of the curies substance. Concentrations of different magnitude may be used simultaneously or sequentially to determine conditions not evident by a single application of radioactive tracer material or by multiple applications of the same concentrations.

Other modes of applying the principle of the invention may be employed, change being made as regards the details described, provided the features stated in any of the following claims, or the equivalent of such, be employed.

I therefore particularly point out and distinctly claim as my invention:

1. The method for determining the fluid conductance of subsurface strata vertically and laterally, comprising the use of at least two wells and the steps of making a natural radioactivity log of the formation in situ in each well; injecting sequentially different radioactive fluids down and out of one of such wells into such subsurface strata as will receive such fluids, making separate radioactivity loggings of each well after each injection.

2. The method for determining the fluid conductance of subsurface strata vertically and laterally, comprising the use of at least two wells in a common pool and the steps of making a first radioactivity log of the natural radioactivity of the formation in situ in each well; injecting a radioactive gas down and out of one of such wells into such subsurface strata as will receive such gas, making a second radioactivity exploration of each well in such common radioactive pool; injecting an incompressible radioactive fluid down and out of one of such wells into such subsurface strata as will receive it, and making separate radioactivity explorations of each well in such common radioactive pool after the injection, to thus determine the formation levels showing maximum radioactivity.

3. The method for determining the fluid conductance of the subsurface strata vertically and laterally, comprising use of at least two wells in a common pool and the steps of making a first radioactive gas down and out of one of such the formation in situ in each well; injecting a radioactivity gas down and out of one of such wells into such subsurface strata as will receive the fluid, making a second radioactivity exploration of each well in such common radioactive pool; after a length of time sufficient to allow decay of the previous injection has elapsed, then injecting radioactive homogeneous liquids down and out of one of such wells into such subsurface strata as will receive the fluids, making a third radioactivity exploration of each well in such common radioactive pool; after a length of time sufficient to allow decay of the previous injection has elapsed, then injecting finely divided radioactive solids down and out of one of such wells into such subsurface strata as will receive the material, and making a fourth radioactivity exploration of each well in said common radioactive pool to thus determine the formation levels showing maximum radioactivity.

HOWARD H. HINSON.

REFERENCES CITED

The following references are of record in the file of this patent:

UNITED STATES PATENTS

| Number | Name | Date |
| --- | --- | --- |
| 2,339,129 | Albertson | Jan. 11, 1944 |
| 2,352,993 | Albertson | July 4, 1944 |
| 2,364,975 | Heigl | Dec. 12, 1944 |
| 2,429,577 | French | Oct. 21, 1947 |